(12) United States Patent
Zeyfang

(10) Patent No.: US 8,051,879 B2
(45) Date of Patent: Nov. 8, 2011

(54) OPEN ENDED INDUSTRIAL PIPE CAP

(75) Inventor: Frederick W. Zeyfang, Erie, PA (US)

(73) Assignee: Protective Industries, Inc., Buffalo, NY (US)

( * ) Notice: Subject to any disclaimer, the term of this patent is extended or adjusted under 35 U.S.C. 154(b) by 0 days.

(21) Appl. No.: 12/457,995

(22) Filed: Jun. 29, 2009

(65) Prior Publication Data

US 2010/0326560 A1 Dec. 30, 2010

(51) Int. Cl.
*F16L 57/00* (2006.01)
*B65D 59/06* (2006.01)

(52) U.S. Cl. ....... 138/96 T; 138/96 R; 138/89; 215/254; 215/256; 220/266; 220/270; 220/276

(58) Field of Classification Search ........... 138/96 R, 138/96 T, 89; 215/254, 256; 220/266, 270, 220/276, 640
See application file for complete search history.

(56) References Cited

U.S. PATENT DOCUMENTS

| | | | | |
|---|---|---|---|---|
| 906,875 A | * | 12/1908 | Hammer | 215/254 |
| 1,214,675 A | | 2/1917 | Heath | 215/253 |
| 1,584,313 A | | 5/1926 | Mallory | 138/96 T |
| 1,600,860 A | | 9/1926 | Young | 138/96 T |
| 1,758,613 A | * | 5/1930 | Lafal | 138/96 R |
| 2,108,583 A | | 2/1938 | Falk | 215/274 |
| 2,130,609 A | | 9/1938 | Alexander | 215/254 |
| 2,133,049 A | | 10/1938 | Shimer | 138/96 T |
| 2,143,480 A | | 1/1939 | Gunderman | 138/96 T |
| 2,157,842 A | | 5/1939 | Armitage et al. | 215/254 |
| 2,316,013 A | | 4/1943 | Mulholland | 138/96 T |
| 2,544,969 A | * | 3/1951 | Underwood | 413/17 |
| 2,898,943 A | | 8/1959 | Kennedy | 138/96 T |
| 3,276,613 A | * | 10/1966 | Bozek | 215/254 |
| 3,511,402 A | * | 5/1970 | Cheeley | 215/254 |
| 3,733,002 A | | 5/1973 | Fujio | 215/12.2 |
| 3,799,381 A | * | 3/1974 | Acton | 215/254 |
| 3,911,960 A | * | 10/1975 | Flimon | 138/96 R |
| 4,259,062 A | * | 3/1981 | Ramesohl et al. | 432/78 |

(Continued)

FOREIGN PATENT DOCUMENTS

DE 28 34 489 2/1980

(Continued)

OTHER PUBLICATIONS

International Search Report and Written Opinion PCT/US2010/038779 (corres. to U.S. Appl. No. 12/457,995) issued Oct. 11, 2010.

*Primary Examiner* — Patrick F Brinson

(57) ABSTRACT

An open ended cap for a pipe is provided comprising a flexible tubular body wherein one end has an inwardly-extending radial rim extending in a plane perpendicular to the longitudinal axis of the tubular body of the end cap. The tubular body may include a finger grip member extending inwardly from an inner periphery of the rim and connected to a tear strip extending across the rim and downwardly along at least a portion of the tubular body. In another embodiment, the tubular body has an interior wall surface having multiple compressible longitudinal fit beads extending from the interior wall surface and spaced about the circumference of the interior wall surface and which are configured to provide contact with the external surface of a pipe upon being inserted into the end cap. Both a tear strip and longitudinal fit beads may also be provided in combination.

20 Claims, 10 Drawing Sheets

U.S. PATENT DOCUMENTS

| | | | |
|---|---|---|---|
| 4,487,229 A | 12/1984 | Dreyfuss et al. | 138/96 T |
| 4,538,740 A * | 9/1985 | Petersen, Jr. | 215/246 |
| 4,616,679 A | 10/1986 | Benton | 138/96 T |
| 5,080,245 A * | 1/1992 | Conard | 215/249 |
| 5,129,531 A | 7/1992 | Beck et al. | 215/256 |
| 5,292,018 A * | 3/1994 | Travisano | 215/246 |
| 5,996,833 A | 12/1999 | Lencioni et al. | 220/257.2 |
| 6,237,790 B1 * | 5/2001 | Verderber | 215/254 |
| 6,499,616 B2 * | 12/2002 | Verderber | 215/254 |
| 6,655,553 B2 | 12/2003 | Staniszewski et al. | 222/153.07 |
| D615,164 S | 5/2010 | Zeyfang | D23/260 |
| D617,426 S | 6/2010 | Zeyfang | D23/260 |

FOREIGN PATENT DOCUMENTS

| | | |
|---|---|---|
| DE | 102 22 308 | 11/2003 |
| FR | 1125546 | 6/1956 |

\* cited by examiner

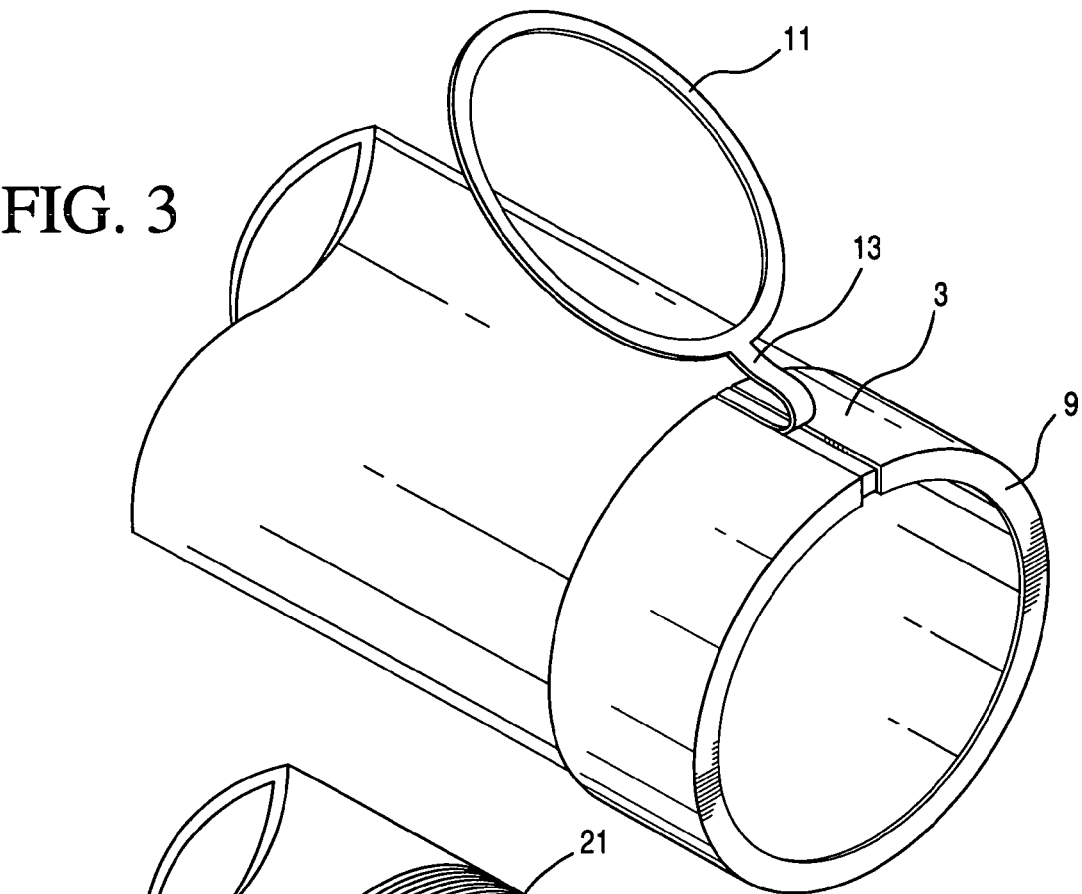
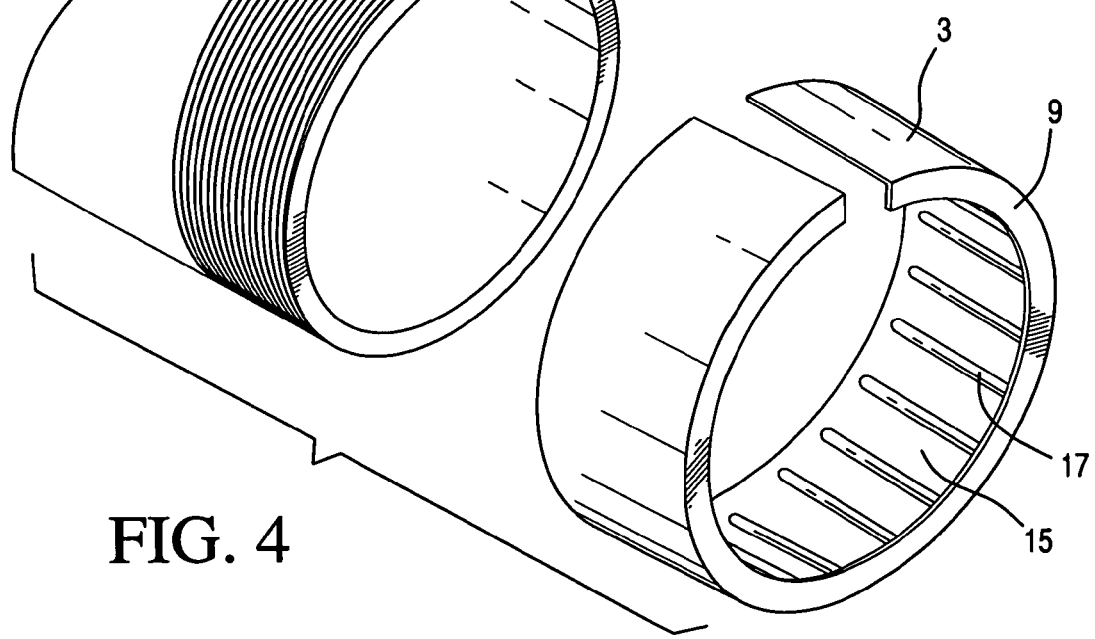

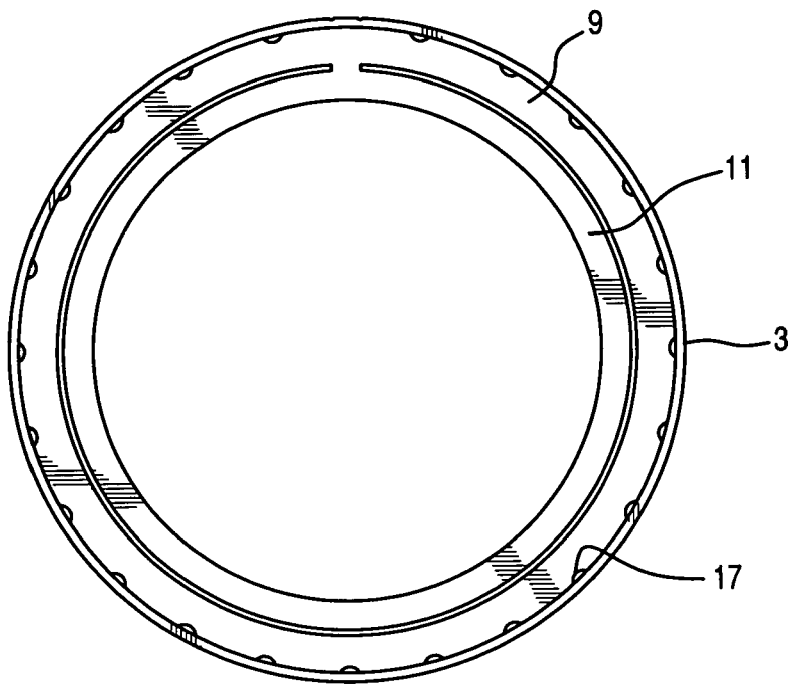
FIG. 5
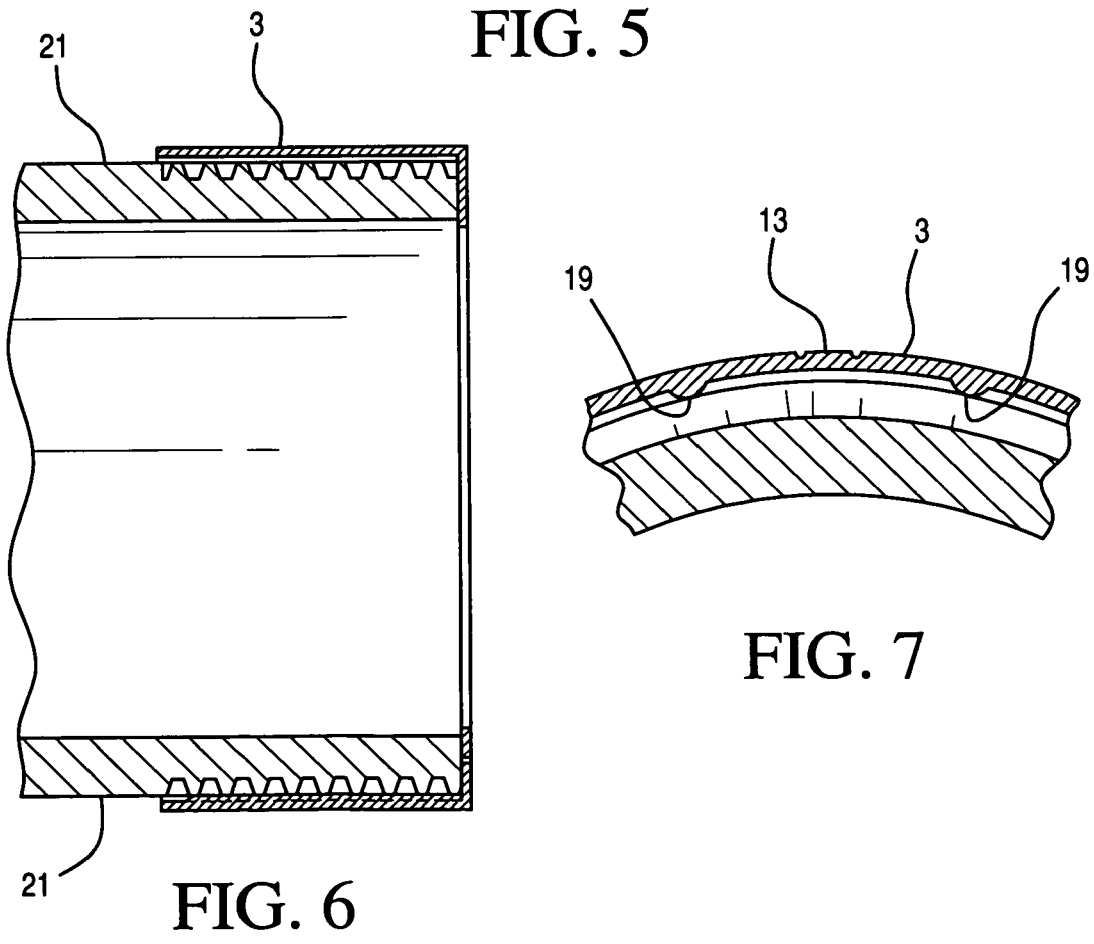
FIG. 6
FIG. 7

OPEN ENDED INDUSTRIAL PIPE CAP

BACKGROUND OF THE INVENTION

The present invention is directed to an open ended cap for industrial pipes.

Open ended pipe caps have been used for many years to protect the threaded ends of black pipe and conduit. The caps typically have a uniform wall thickness and are difficult to install, frequently fall off during transportation and handling, and are difficult to remove. To prevent the caps from prematurely falling off, the caps are frequently intentionally undersized in relation to the pipe to be protected to provide a higher degree of interference between the pipe and the cap. However, this solution has not always been successful, as the caps at times still fall off. Further, the added interference between the end cap and the pipe makes the end cap very difficult to remove, and the end user often is forced to use a knife or tool to aid in the removal of the end cap from the pipe. This often damages the threads that the end cap was originally put on the pipe to protect.

It is thus an object of the present invention to provide an end cap for use with pipes that is easily inserted over the end of the pipe, as well as easily removed.

It is also an object of the present invention to provide an end cap which provides some impact resistance when installed over the end of the pipe.

It is also an object of the present invention to provide an end cap which permits the requisite expansion due to weather extremes.

SUMMARY OF THE PRESENT INVENTION

In accordance with the present invention, there is thus provided a flexible open ended cap for a pipe, the open ended cap comprising a tubular body having first and second open ends. The first end has an inwardly-extending radial rim serving as an abutment surface for a pipe when inserted into the end cap, the rim extending in a plane perpendicular to the longitudinal axis of the tubular body of the end cap.

In one embodiment, the tubular body includes a finger grip member extending inwardly from an inner periphery of the rim, with the finger grip member being connected to a tear strip extending across the rim and downwardly along the longitudinal extent of the tubular body.

In another embodiment, the tubular body has an interior wall surface having multiple compressible longitudinal fit beads extending inwardly from the interior wall surface and spaced about the circumference of the interior wall surface, the beads being configured to provide contact along the longitudinal surface of the beads with the external surface of a pipe upon the pipe being inserted into the end cap.

In yet another embodiment, the tubular body comprises includes a finger grip member extending inwardly from an inner periphery of the rim, with the finger grip member being connected to a tear strip extending across the rim and downwardly along the longitudinal extent of the tubular body, with the tubular body having an interior wall surface having multiple compressible longitudinal fit beads extending inwardly from the interior wall surface and spaced about the circumference of the interior wall surface, the beads being configured to provide contact along the longitudinal surface of the beads with the external surface of a pipe upon the pipe being inserted into the end cap.

BRIEF DESCRIPTION OF THE DRAWINGS

FIG. 3 is a view in perspective of the end cap of FIG. 1 inserted on the end of a pipe as being removed.

FIG. 4 is a perspective view of the embodiment of FIG. 1 when removed from the pipe.

FIG. 5 is a bottom view of the end cap of FIG. 1.

FIG. 6 is a cross-sectional view of the end cap of FIG. 1 when inserted on a pipe.

FIG. 7 is an enlarged view of a portion FIG. 6.

DETAILED DESCRIPTION OF THE INVENTION

The invention will be described in connection with FIGS. 1-21.

The pipe end cap 1 of the present invention comprises a tubular body 3 having a first open end 5 and a second open end 7.

Figure 1:
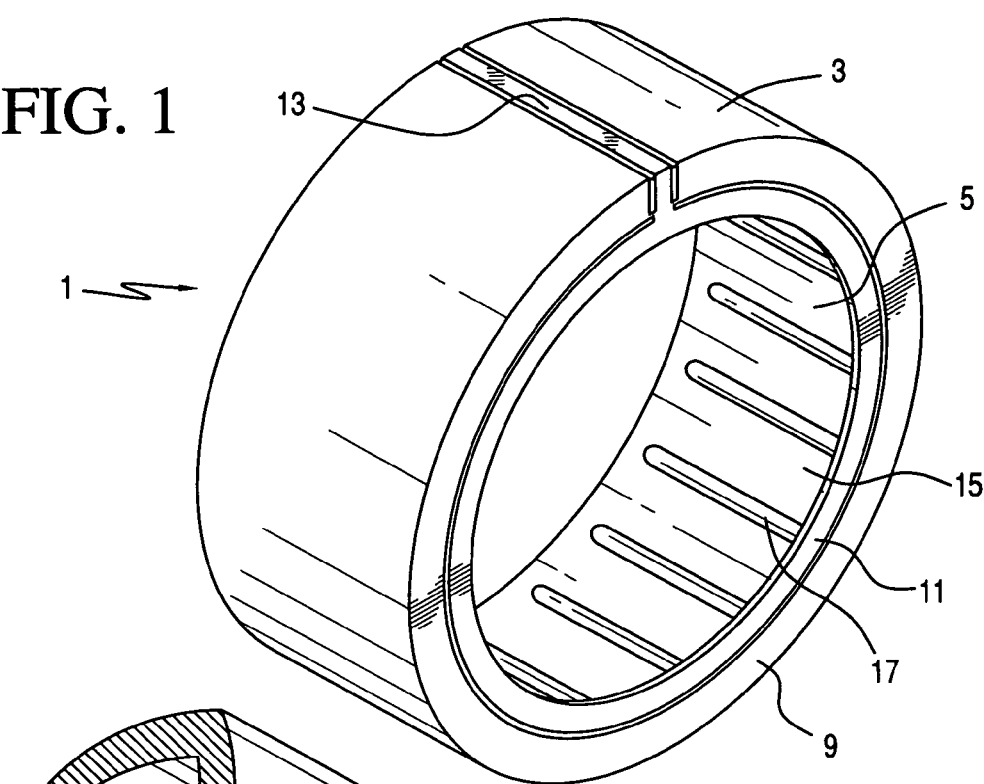
FIG. 1 is a perspective view of one embodiment of the open ended cap of the present invention as viewed from the top.
Figure 2:
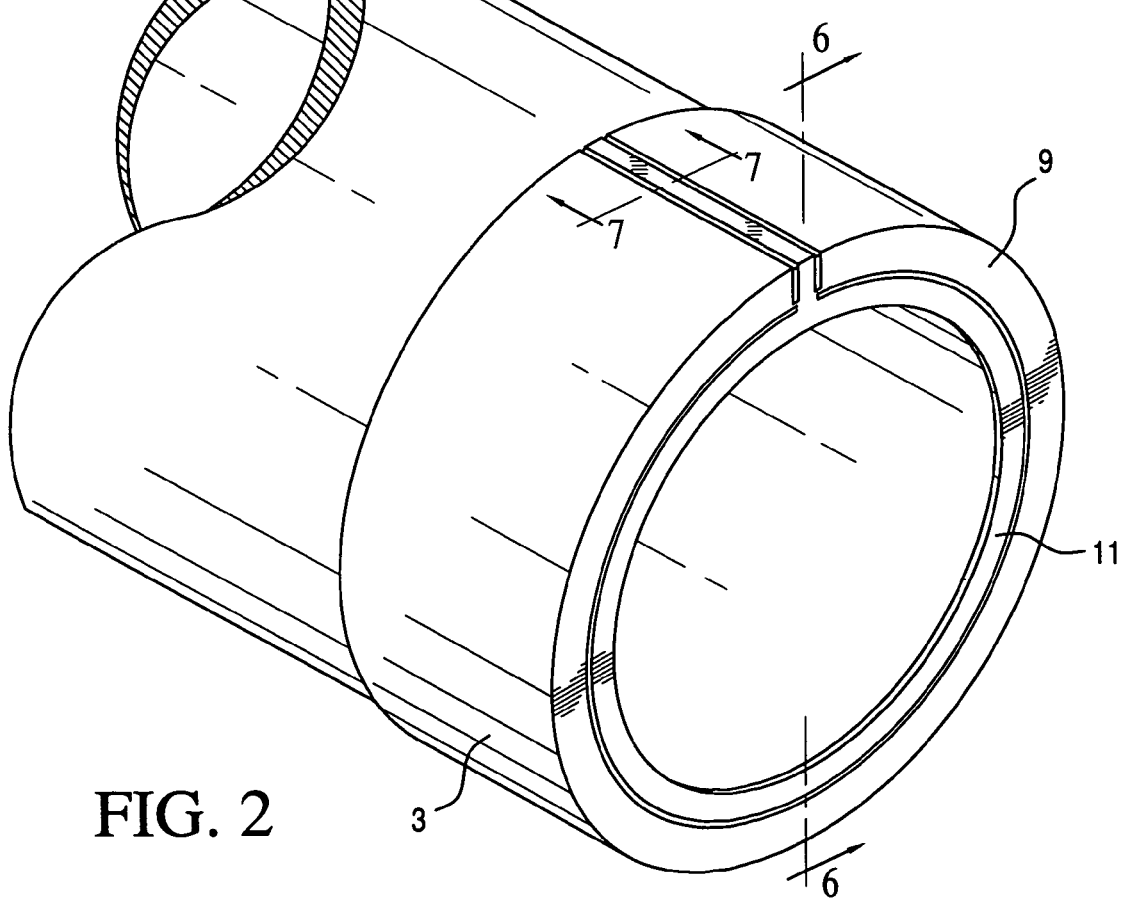
FIG. 2 is a perspective view of the end cap of FIG. 1 inserted on the end of a pipe.
Figure 8:
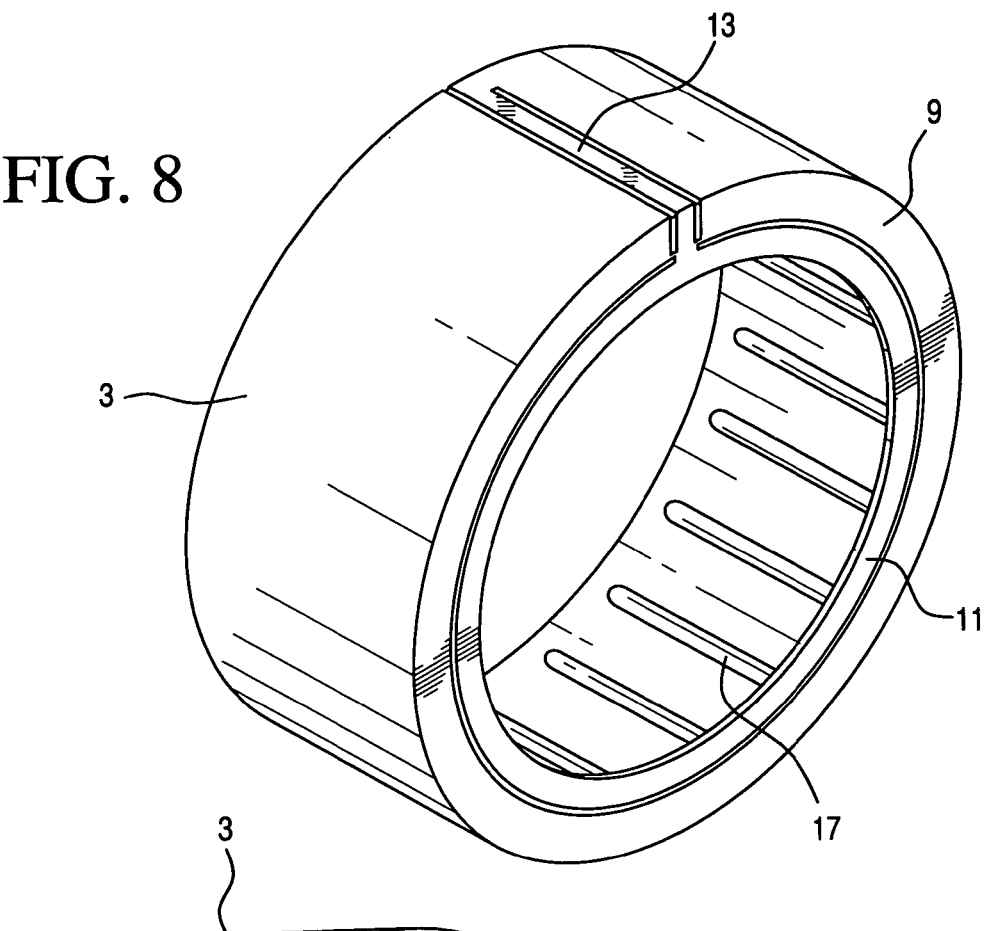
FIG. 8 is a perspective view of another embodiment of the open ended cap of the present invention as viewed from the top.
Figure 9:
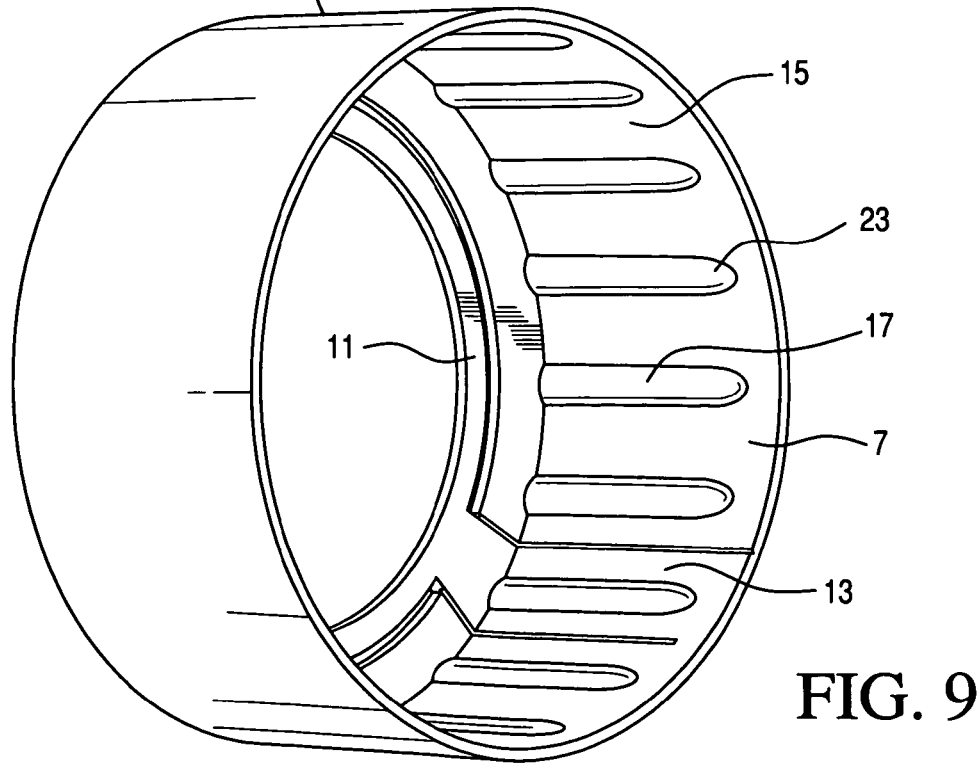
FIG. 9 is a perspective view of another embodiment of the open ended cap of the present invention as viewed from the bottom.

As shown in FIGS. 1 and 2, a first end 5 of the open ended wall cap includes an inwardly-extending radial rim 9 which serves as an abutment surface for a pipe 21 when inserted into the end cap. The rim 9 extends in a plane which is perpendicular to the longitudinal axis of the tubular body of the end cap.

In the embodiment depicted in FIGS. 1-3, 5, 8-12, 14-16 and 18, a finger grip member in the form of a pull ring 11 extends about an inner periphery of the rim, with the pull ring being connected to a tear strip 13 which extends across the rim and downwardly along at least a portion of the longitudinal extent of the tubular body.

Figure 13:
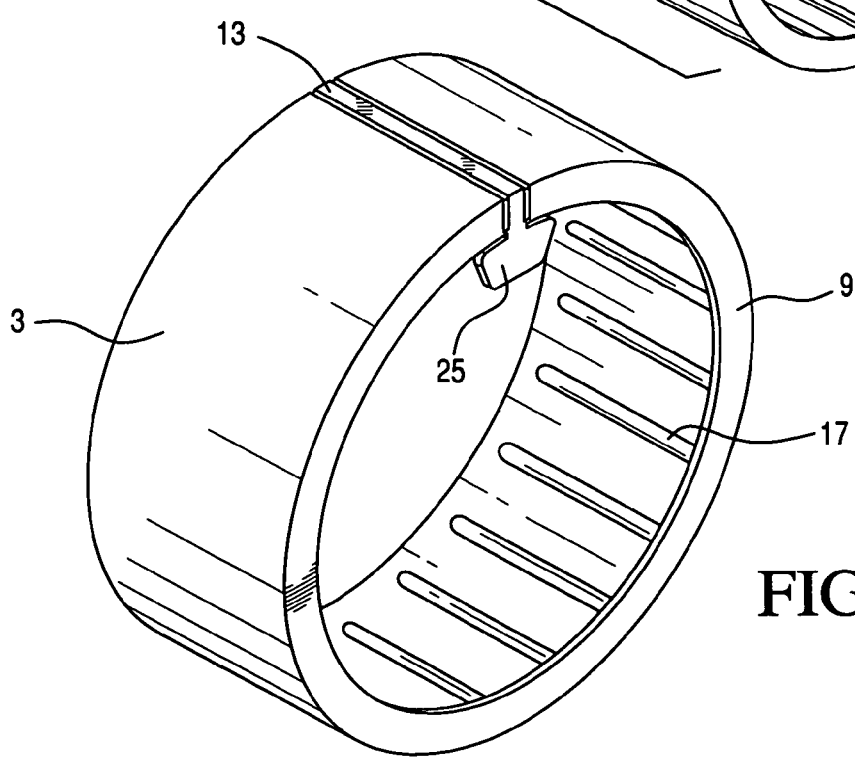
FIG. 13 is a perspective view of another embodiment of the open ended cap of the present invention as viewed from the top.
Figure 14:
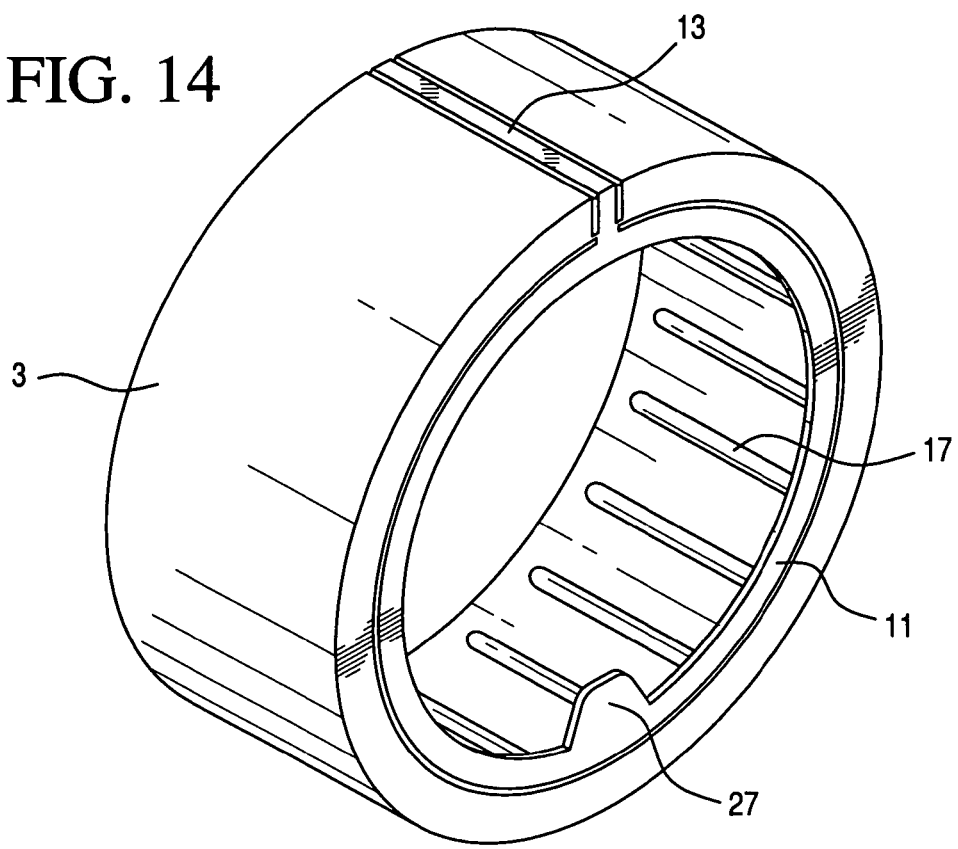
FIG. 14 is a perspective view of another embodiment of the open ended cap of the present invention as viewed from the top.
Figure 21:
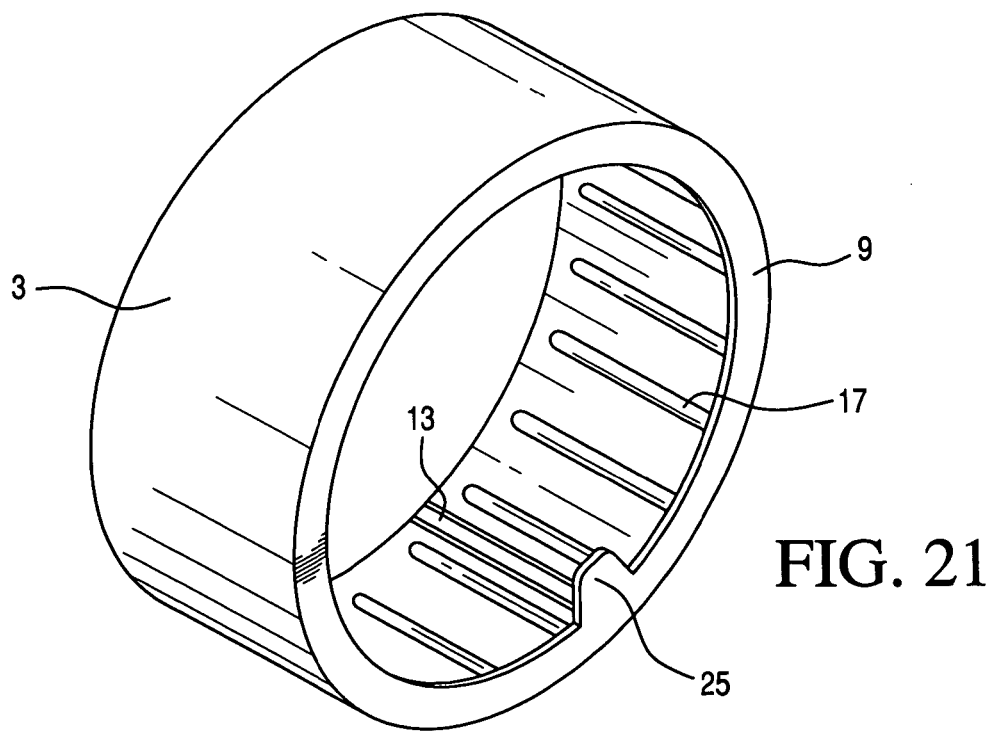
FIG. 21 is a perspective view of an embodiment of the present invention wherein the tear strip is located on an inside wall.

While shown in FIGS. 1-3, 5, 8-12 and 14-16 as a pull ring which extends about the entire periphery of the first end 5 of the tubular member, the finger grip member may take many forms, which forms are not critical to practice of the claimed invention. For instance, the finger grip member may be in the form of a pull ring which extends about the entire periphery of the first end of the tubular member, and which includes a grip member 27 extending from the pull ring (FIG. 14). Alternatively, the finger grip member may comprise a tab member 25 which extends from the periphery of the hole, and which is otherwise attached to the tear strip as shown in FIGS. 13 and 21. By way of yet an additional embodiment, the finger grip member may comprise a member 29 which extends partially about the periphery of the hole, having a tab extending from an end thereof for gripping (FIG. 17).

The particular configuration of the finger grip member is not critical to practice of the present invention, with the finger grip member being attached at one end to the tear strip. In operation, the finger grip member is gripped and the member pulled upwardly away from the hole and downwardly along the side of the tubular body to pull the tear strip away from the tubular body. Upon the tearing of the tear strip along its furthest extent along the tubular body, whereby adjacent portions of the tubular body are caused to be separated from one another, the tubular body may be easily separated from engagement with the end of the pipe. See FIGS. 3, 4, 11, 12 and 16 which depict the sequence of removal of the pull ring and the tearing of the tear strip.

The tear strip 13 may be present either on the exterior surface of the tubular body (FIGS. 1-3, 8, 10, 13-17), or on the interior surface of the tubular body (FIGS. 9, 11, 18, 21). The placement of the tear strip is not critical to practice of the invention. However, if it is desired to have a smooth outer surface of the tubular body, the tear strip will be placed on the interior wall surface of the tubular body.

Figure 15:
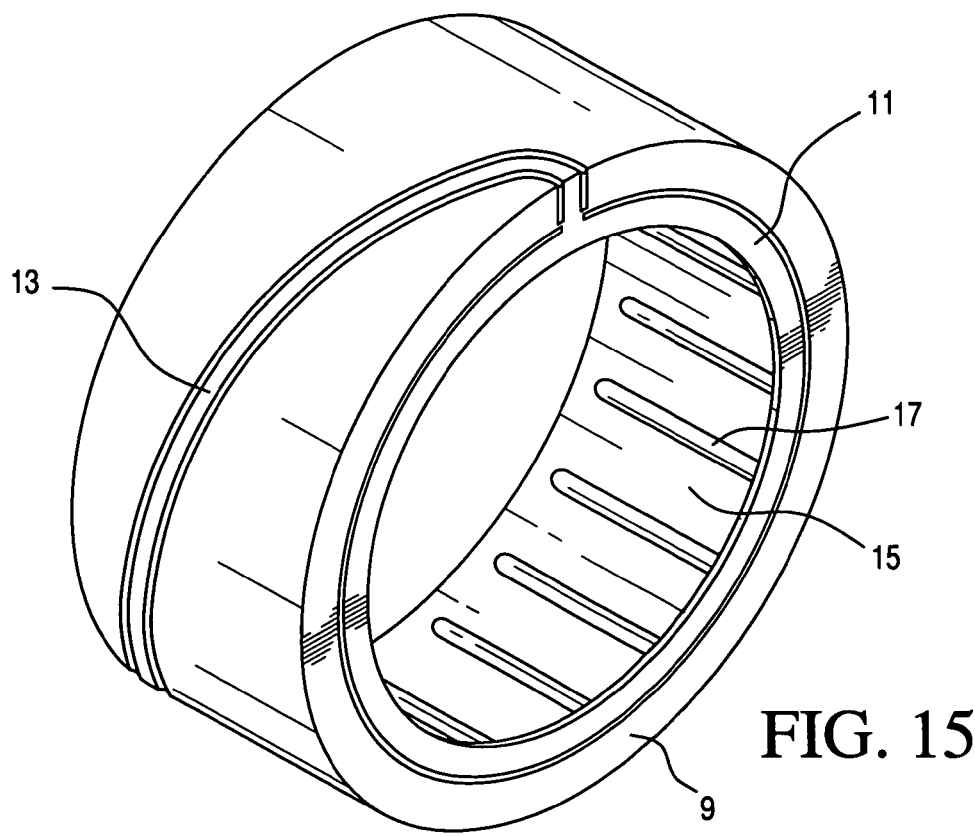
FIG. 15 is a perspective view of another embodiment of the open ended cap of the present invention as viewed from the top having a radial tear strip.
Figure 16:
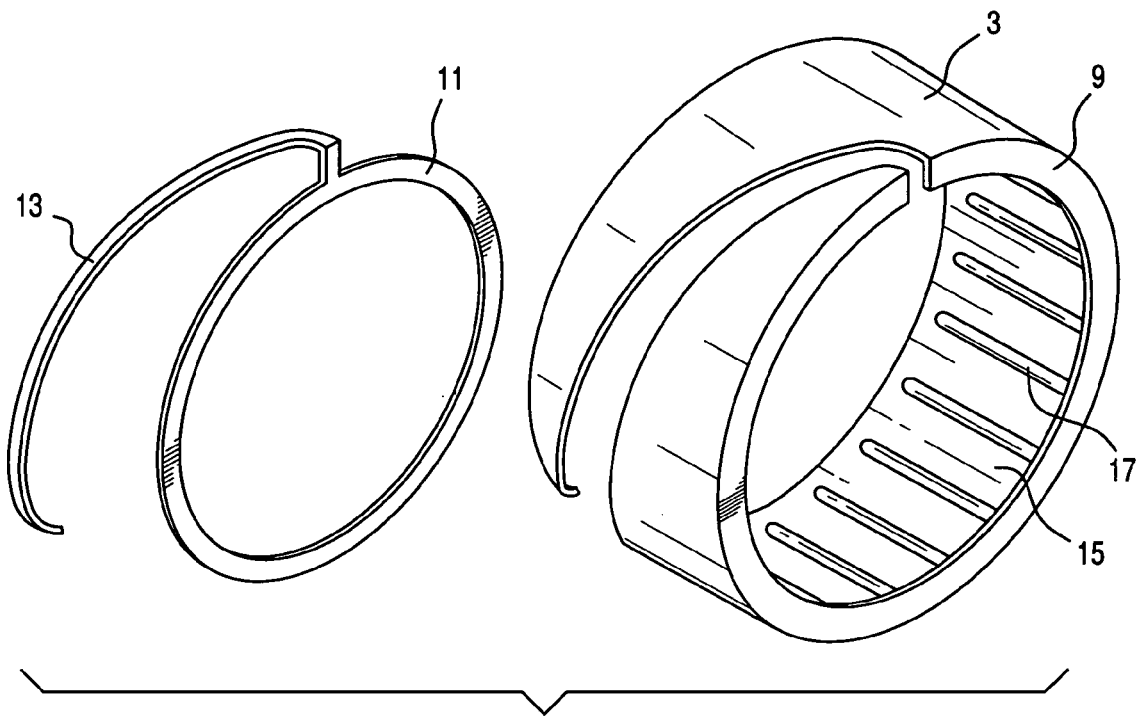
FIG. 16 is a perspective view of the embodiment of FIG. 15 wherein the end cap is pulled off of the pipe.
Figure 17:
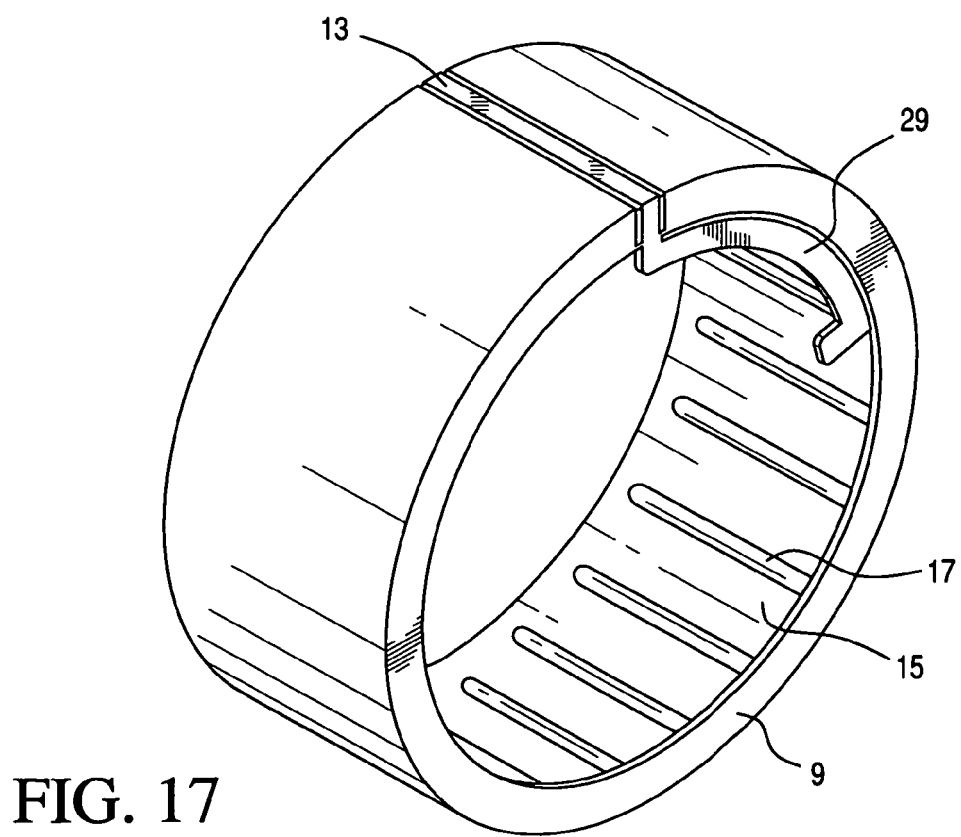
FIG. 17 is a perspective view of another embodiment of the open ended cap of the present invention as viewed from the top.
Figure 18:
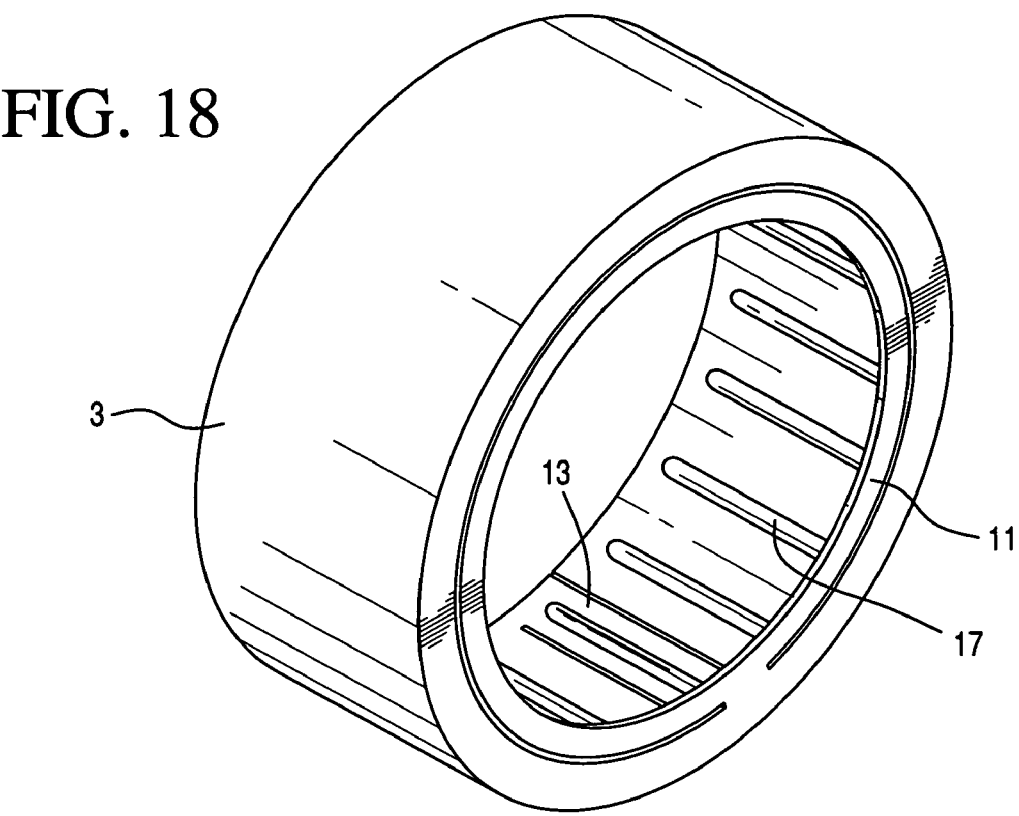
FIG. 18 is a perspective view of the embodiment of FIG. 9 from the top.

However, as shown in FIGS. 1-3, 10, 13-15 and 21, in one embodiment, the opposing edges of the tear strip each extend to the bottom of the tubular body, such that, when the tear strip is intentionally torn, it completely separates from the body as shown in FIGS. 4 and 16. Alternatively, it is possible for one side of the tear strip to extend down only a partial way along the longitudinal extent of the tubular body while the other side extends to the bottom of the tubular body, so that, once torn, one end of the tear strip remains in contact with the tubular body, as opposed to being fully torn therefrom. See FIGS. 8, 9, 12 and 18. However, despite that fact that the tear strip may remain in contact with the tubular body, the tubular body is caused to be sufficiently loosed from its grip with the end of the pip (FIGS. 4, 12, 16) and easily removed.

The tear strip 13 may take many forms. For instance, as shown in FIGS. 1-3 and 8-14, the tear strip may extend downwardly along the tubular body generally in a line substantially perpendicular to the planes of the first and second holes. The tear strip may also extend radially about the side of the tubular member, either along an inner surface, or along the outer surface as shown in FIGS. 15 and 16.

The tear strip may be formed conventional means such as by molding parallel linear areas of reduced thickness in relation to adjacent areas of the tubular member, such that the linear areas of reduced thickness are more easily ripped or torn when force is applied thereto by means of gripping and exerting force to the attached finger grip member.

Figure 10:
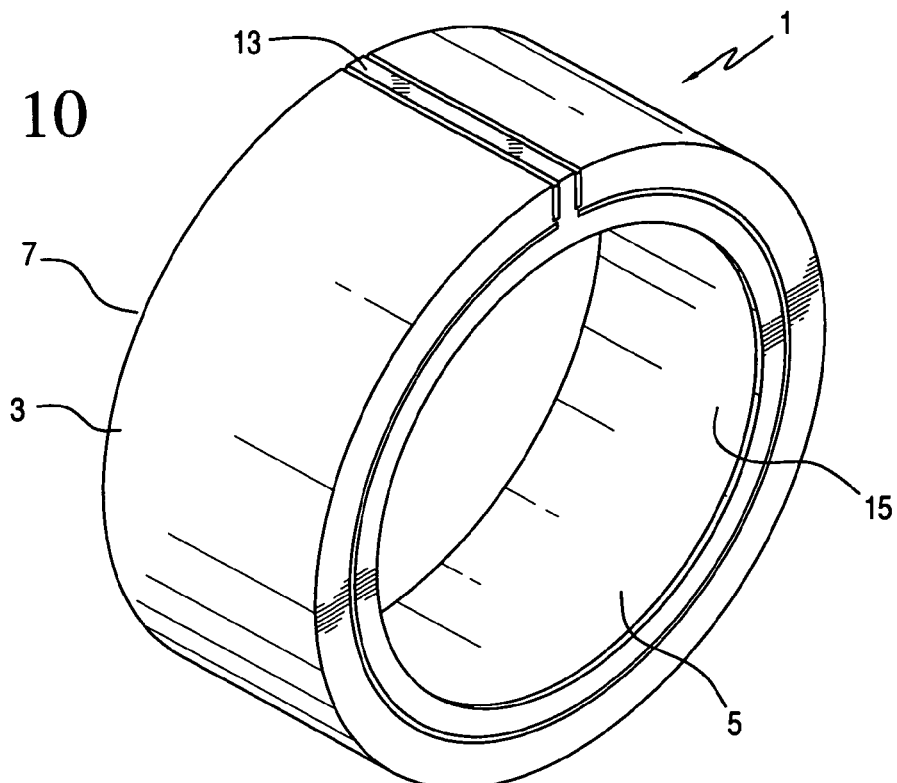
FIG. 10 is a perspective view of another embodiment of the open ended cap of the present invention as viewed from the top.
Figure 11:
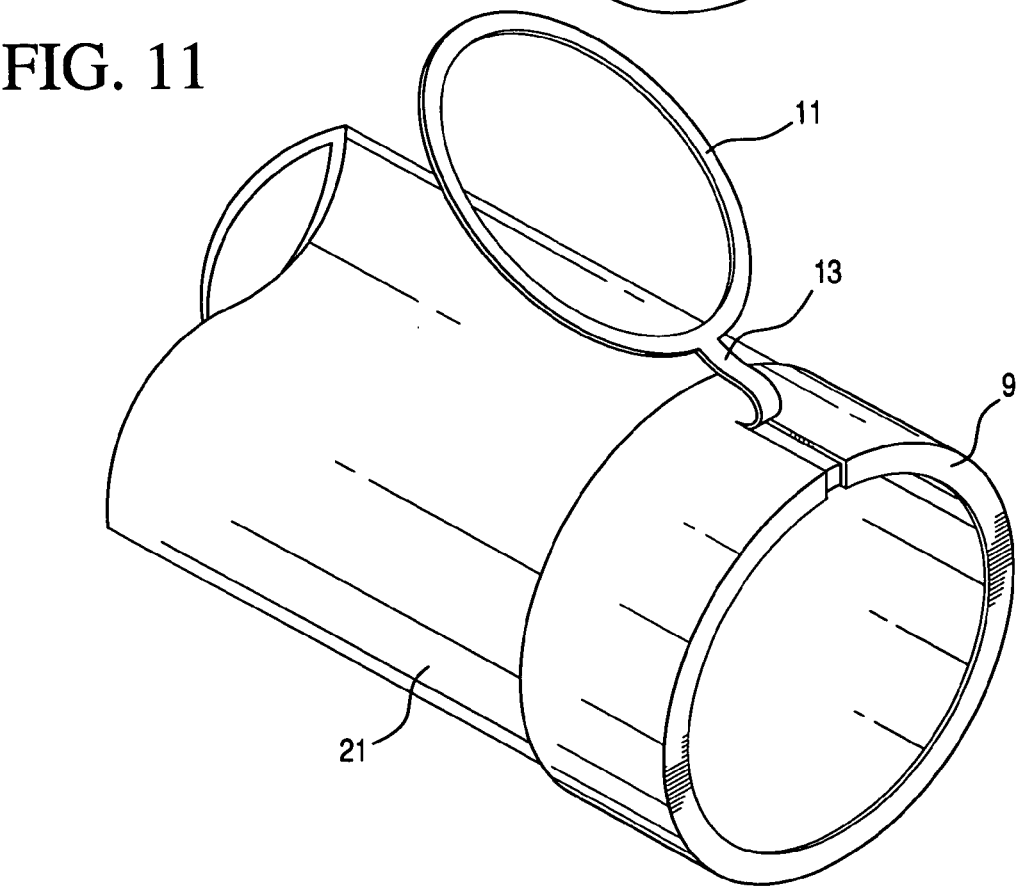
FIG. 11 is a view in perspective of the open-ended cap of another embodiment inserted on the end of a pipe and being removed.
Figure 12:
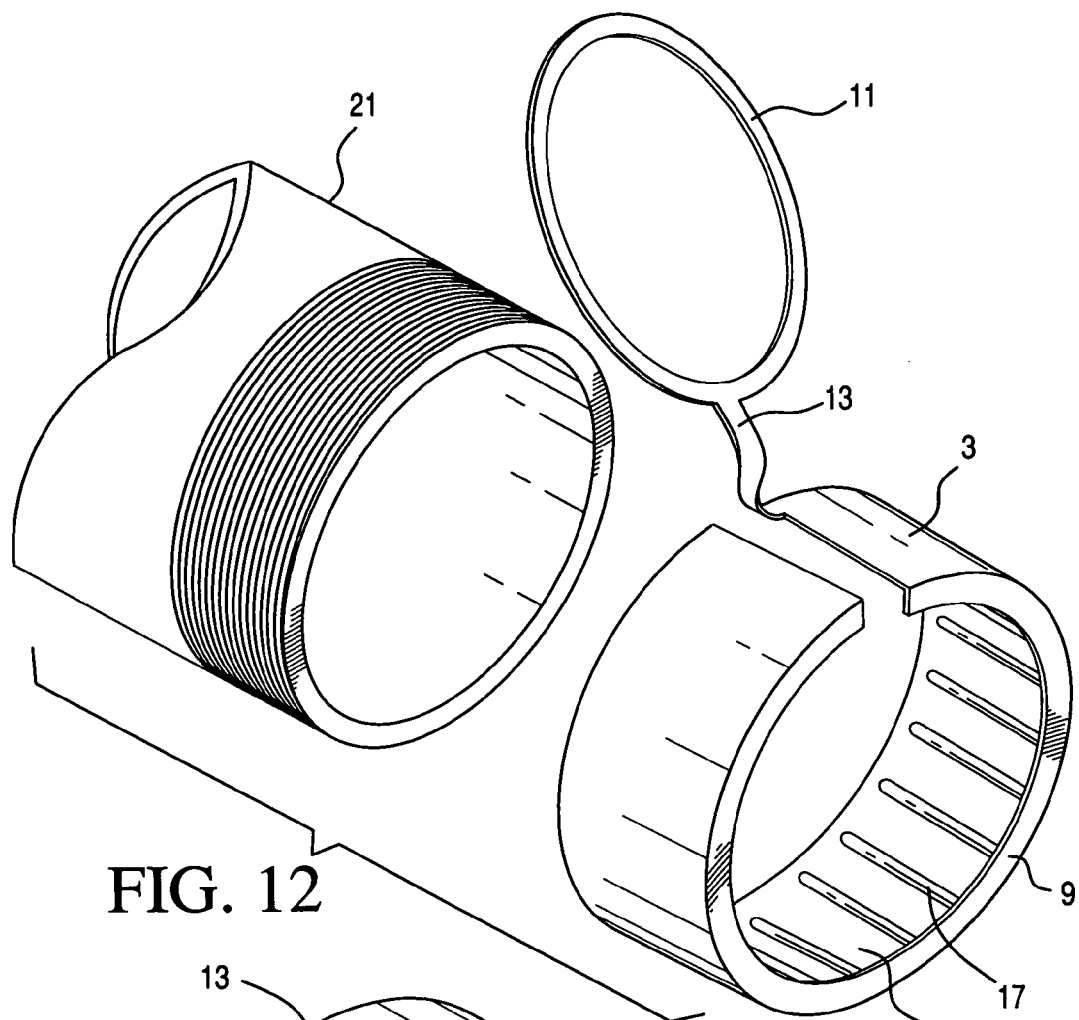
FIG. 12 is a perspective view of the embodiment of FIG. 11 upon removal from a pipe.

The inner wall of the tubular body may be smooth in accordance with the present invention as shown in FIG. 10. However, in order to enhance the fit between the interior wall and the wall of a pipe inserted into the end cap, the interior wall surface 15 of the tubular member optionally may include multiple longitudinal fit beads 17 extending from the interior surface of wall 15 and spaced about the circumference of the interior surface. The beads 17 are configured at their innermost point 19 to provide contact with a pipe wall along the longitudinal surface of the beads upon insertion of the pipe into the end cap. The external surface of a pipe 21, upon being inserted into the end cap 1, abuts the innermost portion 19 of the surface of the beads 17, and become snugly fit within the end cap body due to the combined action of the beads as they become compressed against the external surface of the pipe 21, and in particular, the screw threads. The bead geometry, material selection, and proportional size allow for the beads to slide over the thread crest during assembly, and then cold flow or creep into the adjacent thread to lock the cap onto the threaded end of the pipe.

The beads 17 extend longitudinally along an extent of the inner surface of the wall 15, preferably beginning substantially adjacent one open end and terminating substantially adjacent the other open end. It is thus within the scope of the invention for the beads to terminate short of each end, such that the ends of the beads are spaced from each open end. If spaced from either end, such spacing distance is not particularly critical to practice of the invention. However, to enhance contact with the threads on the pipe, it is preferred that the beads 17 extend substantially to the first open end.

The end of the beads 17 closest to the second open end preferably has a tapered configuration 23 to permit ease of insertion of the end of the pipe 21 into the end cap 1 and over the edge of the beads. The particular form of tapering is not critical to practice of the invention. The slope of the taper is also not critical, and will generally range from about 0.25 to 3 degrees. The beads extend along the interior surface of the wall 15 in a line parallel to the longitudinal axis of the end cap.

The number of longitudinal beads employed may vary. At a minimum, three fit beads would be employed, preferably equally spaced about the circumference of the wall 15 for purpose of stability upon insertion of the pipe. It is frequently desirable, however, to use a larger number of fit beads in order to minimize the spacing between the beads, while also ensuring a secure fit against the pipe surface due to the greater number of contact points between the fit beads and the pipe wall. A larger number of fit beads also assists in minimizing the entry of extraneous material such as dirt, moisture, etc. into the pipe through the spaces between the fit beads.

Figure 19:
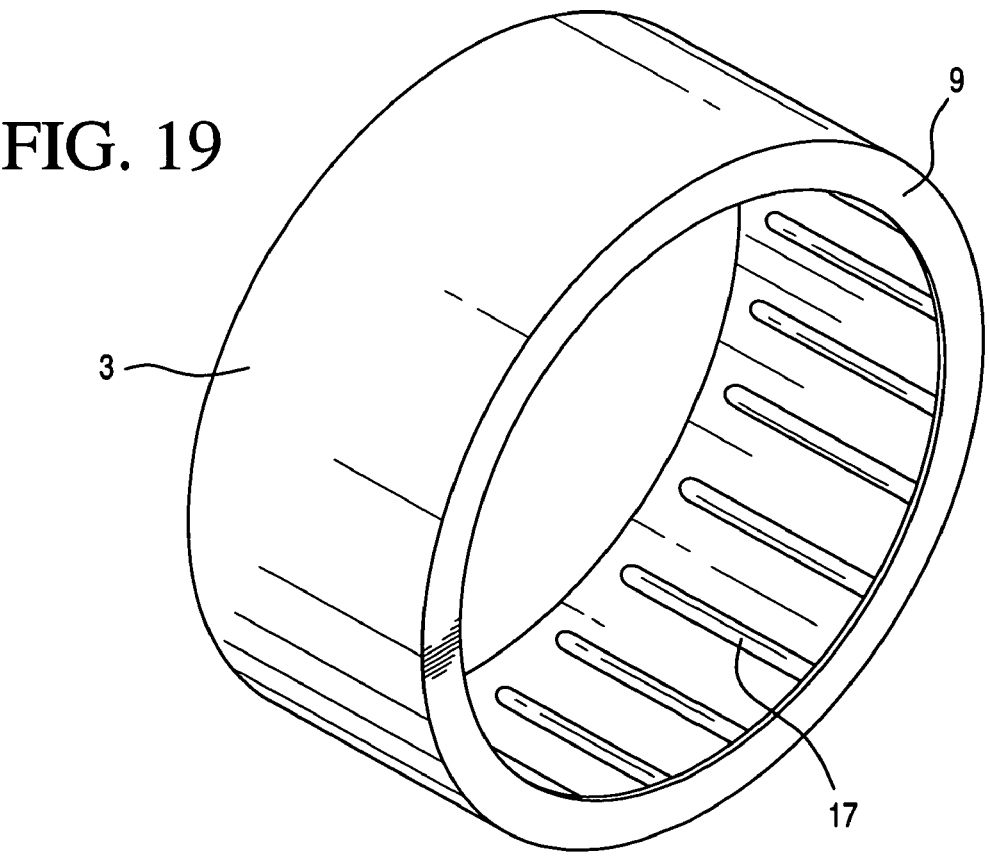
FIG. 19 is a perspective view of an embodiment of the present invention without the tear strip and pull ring when viewed from the top.
Figure 20:
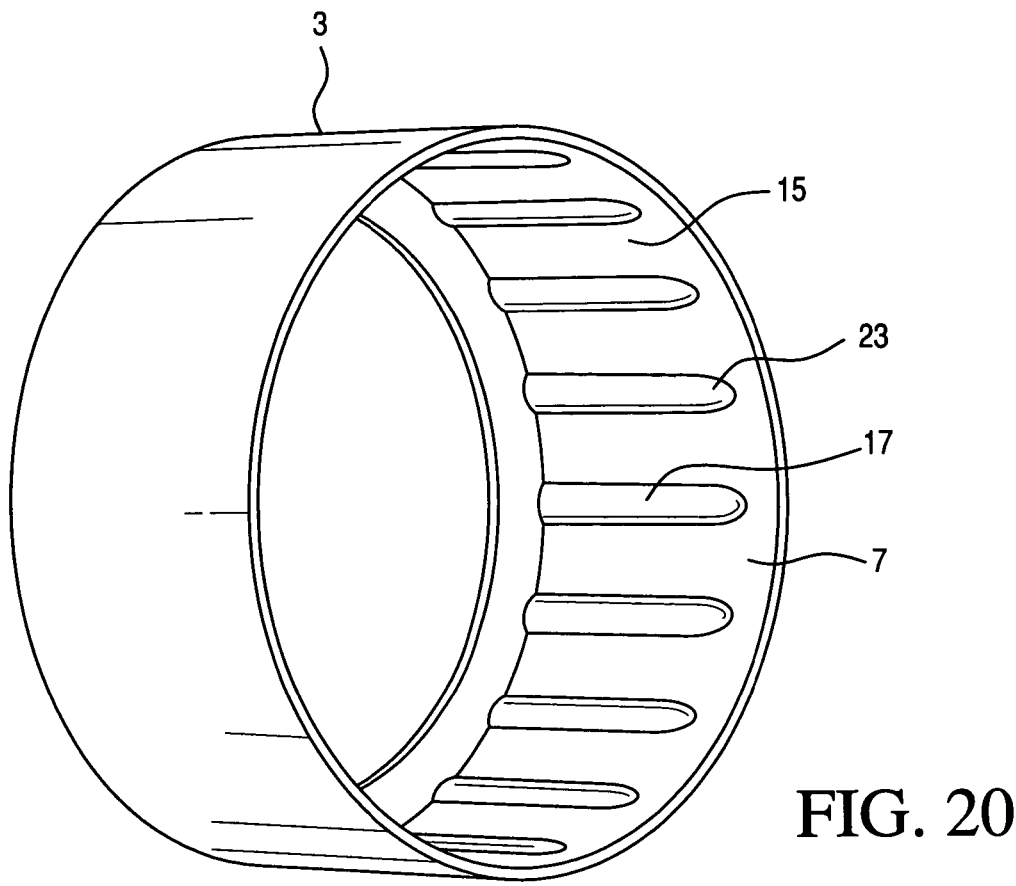
FIG. 20 is a perspective view of the embodiment of the present invention without the tear strip and pull ring when viewed from the bottom.

The open ended cap of the present invention may also be comprised of the longitudinal fit beads alone (i.e., without the tear strip) as shown in FIGS. 19, 20. In such an embodiment, the presence of the longitudinal fit beads provides the advantage of assisting the end cap remain in contact with the end of the pipe due to the cold flow engagement of the longitudinal fit beads with the screw threads at the end of the pipe.

Obviously, the number of fit beads employed will depend upon the size of the end cap, the size of the fit beads, and the amount of surface of the end cap desired to have fit beads. For instance, with a 2.5 inch outer diameter end cap, 14-24 longitudinal fit beads may function well. By way of example, such an end cap could have a length of approximately one inch, with such fit beads would have a longitudinal dimension of approximately 0.75-0.80 inch extending from the bottom of the end cap. The fit beads would, in such an example, have a height of approximately 0.05 inch and a width of approximately 0.15 inch, with a bead gap of approximately 0.25 inch. As noted above, one of ordinary skill in the art can readily arrive at acceptable dimensions upon practice of the present invention.

The diameter of the fit beads depends upon the size of the end cap, with smaller end caps having fit beads of smaller dimension than larger end caps The above embodiments are provided solely by way of example, and are not intended to be limiting as to the ultimate scope of the present invention. For example, different diameters of end caps may be employed, as well as different numbers of fit beads used in the end caps.

The fit beads may be of any configuration which provides the requisite contact with the pipe wall. While rounded bead heads 19 are shown in the Figures, beads which have a more flattened upper surface, may be used with advantage.

The fit beads do not all need to be equally spaced about the circumference of the wall 15, nor do the fit beads have to be placed about the entire circumference. It is only necessary for sufficient fit beads to be at sufficient points about the circumference for the end cap to be snugly attached to the pipe.

For instance, the fit beads may be employed in groupings about the circumference of the wall 15. That is, multiple groupings of, for instance, 8 equally spaced fit beads may be present along the circumference, with a larger space being provided between the respective groupings of fit beads than between the individual fit beads within the groupings. Other configurations may occur to those skilled in the art, such as groupings with smaller or larger numbers of fit beads, or different numbers of groupings about the circumference, which are within the scope of the invention. It is merely necessary for there to be sufficient contact between the fit beads and the pipe wall for the end cap to be securely attached to the pipe.

Fit beads can be essentially touching adjacent fit beads, with a minimum spacing of about 0.010 inch desirable. Preferably, the space between the fit beads ranges from about 0.20 to about 0.30 inch, with the exception of when the fit beads are grouped about the circumference, in which case the groups of fit beads themselves may be spaced further apart.

The size (diameter and height) of the fit beads is not critical, and is generally determined by the diameter of the end cap. It is important for the fit bead to have sufficient height so as to enable the fit bead to have adequate mass to be compressed in a manner which serves to maintain the end cap in place on the pipe wall.

The geometry of the wall and the fit beads enables several advantages to be achieved. Since the combined thickness of the fit beads and the adjacent wall is significantly greater than thickness of the wall portion which forms the space between the fit beads, this enables the wall portion between the fit beads to be smaller in thickness than might normally be the case. Indeed, the thickness of the wall portion may be reduced by up to 50 percent or so. This enhances the flexibility of such wall portion and enables the end cap wall to flex more easily under extreme temperature conditions.

The tubular member may also have such dimensions as to provide ease of insertion over the end of the pipe, while still ensuring that the end cap is satisfactorily retained on the end of the pipe. For instance, the outside diameter of the end of the tubular member which is inserted over the end of the pipe may be slightly larger than the outside diameter of the end of the tubular member which includes the radial rim. In this way, the end cap is more easily inserted over the end of the pipe, with the end of the pipe being more snuggly fit into the opposite end of the tubular member.

It is contemplated that the open end pipe cap of the present invention will be used in connection with pipes having diameters ranging from ½ inch to 8 inch diameters, although the particular size of the pipe is not critical, as the end cap can be molded to fit any desired size of pipe.

The end cap of the present invention may be produced by conventional injection molding techniques. The material employed for the end cap will typically be polyethylene, for the reason that it is cost-effective, is flexible, and provides good weather resistance. Either low density or linear low density polyethylene or flexible vinyl are preferred molding materials for use in the present invention. The use of such polyethylene or vinyl material enables the fit beads, when employed, to both allow the fit bead to slide across the pipe thread crests during installation, yet still relax and creep into the thread after being positioned on the end of the pipe. One of ordinary skill in the art can readily determine acceptable molding materials from which the open ended pipe cap may be made.

What is claimed is:

1. An open ended cap for an industrial pipe comprising a flexible tubular body having first and second open ends, said first end having an inwardly-extending radial rim serving as an abutment surface for a pipe when inserted into the end cap, the rim extending in a plane perpendicular to the longitudinal axis of the tubular body of the end cap, and a finger grip member extending inwardly from an inner periphery of the rim and residing in the same plane as said rim, with the finger pull grip member being connected to a tear strip extending across said rim and downwardly along at least a portion of the longitudinal extent of the tubular body, wherein said tubular body has an interior wall surface having multiple compressible longitudinal fit beads extending from said interior wall surface and spaced about the circumference of said interior wall surface, said beads configured to provide engaging contact along the longitudinal surface of the beads with pipe threads along the external surface of a pipe upon being inserted into said end cap, an end of said longitudinal fit beads closest to said first open end being tapered.

2. The end cap of claim 1, wherein one lateral tear line of said tear strip extends downwardly along only a portion of said longitudinal extent of the tubular body, whereby an opposing lateral tear line extends along the full extent of said tubular body.

3. The end cap of claim 1, wherein said tear strip extends downwardly along the longitudinal extent of the tubular body.

4. The end cap of claim 1, wherein said tear strip extends spirally about the tubular extent of the tubular body.

5. The end cap of claim 2, wherein said finger grip member comprises a finger pull ring extending about an inner periphery of the rim, said pull ring being connected to said tear strip.

6. The end cap of claim 1, wherein said longitudinal fit beads are evenly spaced about the entire circumference of said wall.

7. The end cap of claim 1, wherein said longitudinal fit beads have a curved surface.

8. The end cap of claim 1, wherein said longitudinal fit beads terminate at a point spaced from said first end.

9. The end cap of claim 1, wherein said tear strip extends downwardly along an inner surface of said tubular body.

10. The end cap of claim 1, wherein said tear strip extends downwardly along an outer surface of said tubular body.

11. The end cap of claim 4, wherein said finger grip member comprises a finger pull ring extending about an inner periphery of the rim, said pull ring being connected to said tear strip.

12. An open ended cap for an industrial pipe comprising a flexible tubular body having first and second open ends, said first end having an inwardly-extending radial rim serving as an abutment surface for a pipe when inserted into the end cap, the rim extending in a plane perpendicular to the longitudinal axis of the tubular body of the end cap, and a finger grip member extending inwardly from an inner periphery of the rim and residing in the same plane as said rim, wherein said finger grip member comprises a finger pull ring extending completely about and adjacent an inner periphery of the rim, with the finger pull grip member being connected to a tear strip extending across said rim and downwardly along at least a portion of the longitudinal extent of the tubular body, wherein said tubular body has an interior wall surface having multiple compressible longitudinal fit beads extending from said interior wall surface and spaced about the circumference of said interior wall surface, said beads configured to provide engaging contact along the longitudinal surface of the beads with pipe threads along the external surface of a pipe upon being inserted into said end cap, an end of said longitudinal fit beads closest to said first open end being tapered.

13. The end cap of claim 12, wherein one lateral tear line of said tear strip extends downwardly along only a portion of said longitudinal extent of the tubular body, whereby an opposing lateral tear line extends along the full extent of said tubular body.

14. The end cap of claim 12, wherein said tear strip extends downwardly along the longitudinal extent of the tubular body.

15. The end cap of claim 12, wherein said tear strip extends spirally about the tubular extent of the tubular body.

16. The end cap of claim 12, wherein said longitudinal fit beads are evenly spaced about the entire circumference of said wall.

17. The end cap of claim 12, wherein said longitudinal fit beads have a curved surface.

18. The end cap of claim 12, wherein said longitudinal fit beads terminate at a point spaced from said first end.

19. The end cap of claim 12, wherein said tear strip extends downwardly along an inner surface of said tubular body.

20. The end cap of claim 12, wherein said tear strip extends downwardly along an outer surface of said tubular body.

\* \* \* \* \*

UNITED STATES PATENT AND TRADEMARK OFFICE
CERTIFICATE OF CORRECTION

| | | |
|---|---|---|
| PATENT NO. | : 8,051,879 B2 | Page 1 of 1 |
| APPLICATION NO. | : 12/457995 | |
| DATED | : November 8, 2011 | |
| INVENTOR(S) | : Frederick W. Zeyfang | |

It is certified that error appears in the above-identified patent and that said Letters Patent is hereby corrected as shown below:

In the claims

In the last line of Claim 1 (column 6, line 34), before "open end" delete "first" and insert --second--;

In the last line of Claim 12 (column 7, line 14), before "open end" delete "first" and insert --second--.

Signed and Sealed this
Twenty-third Day of June, 2015

Michelle K. Lee
*Director of the United States Patent and Trademark Office*